(12) United States Patent
Depase et al.

(10) Patent No.: US 7,588,711 B2
(45) Date of Patent: Sep. 15, 2009

(54) METHOD FOR FORMING A COMPOSITE SUPPORT BEAM

(75) Inventors: Edoardo P. Depase, Seattle, WA (US); Kurtis Willden, Kent, WA (US); Grant Zenkner, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 11/561,959

(22) Filed: Nov. 21, 2006

(65) Prior Publication Data

US 2008/0115555 A1  May 22, 2008

(51) Int. Cl.
*B21D 47/01* (2006.01)
(52) U.S. Cl. ............ 264/297.8; 264/258; 264/339; 264/297.5; 264/297.6; 264/297.9
(58) Field of Classification Search ............ 264/259, 264/258, 152, 314, 315, 523, 573, 275, 248, 264/295, 296, 297.5, 297.6, 297.8, 339
See application file for complete search history.

(56) References Cited

U.S. PATENT DOCUMENTS

| | | | | |
|---|---|---|---|---|
| 4,734,155 A | * | 3/1988 | Tsunoda et al. | 156/583.1 |
| 5,714,104 A | * | 2/1998 | Bailey et al. | 264/254 |
| 2003/0218267 A1 | * | 11/2003 | Husmann et al. | 264/101 |
| 2004/0041304 A1 | * | 3/2004 | Willden et al. | 264/324 |
| 2004/0043196 A1 | * | 3/2004 | Willden et al. | 428/174 |
| 2004/0113315 A1 | * | 6/2004 | Graham | 264/266 |
| 2004/0145080 A1 | * | 7/2004 | Tanaka | 264/257 |
| 2005/0053762 A1 | | 3/2005 | Wilden et al. | |
| 2006/0113706 A1 | * | 6/2006 | Chevin et al. | 264/258 |
| 2006/0231981 A1 | | 10/2006 | Lee et al. | |
| 2007/0176323 A1 | * | 8/2007 | Jones et al. | 264/258 |

FOREIGN PATENT DOCUMENTS

| | | |
|---|---|---|
| EP | 1 231 046 A2 | 8/2002 |
| EP | 1 481 790 A2 | 12/2004 |
| WO | WO 96/06726 | 3/1996 |

OTHER PUBLICATIONS deLuca, P.; Pickett, A.K.; Industrial Examples of Forming Non-metallic parts using Pam-Form; Oct. 9, 1998; Seminar publication, PAM '98, PSI/ESI Group; pp. 1-19.*
Gutowski, T.G.; Advanced Composites Manufacturing; Jul. 18, 1997; Wiley-Interscience; 1st Edition; pp. 298-368.*
Modin, A.; Hot Drape Forming of Thermoset Prepregs; Jan. 20, 1993; Society of Manufacturing Engineers; pp. 1-13.*
International Search Report for PCT/US2007/021750, mailed Mar. 17, 2008, 12 pages.

* cited by examiner

*Primary Examiner*—Philip C Tucker
*Assistant Examiner*—Keith T Aziz
(74) *Attorney, Agent, or Firm*—Alston & Bird LLP

(57) ABSTRACT

A method of forming a support beam is provided. One exemplary method of forming a support beam includes supporting a C-shaped charge upon a first forming tool and placing an additional composite charge upon at least a portion of the C-shaped charge and a second forming tool proximate the first forming tool. The method of forming a support beam further includes positioning a fixed forming tool proximate a first portion of the additional charge and bending the additional charge about the forming tool.

20 Claims, 4 Drawing Sheets

METHOD FOR FORMING A COMPOSITE SUPPORT BEAM

BACKGROUND

1) Technical Field

Embodiments of the disclosure relate to methods for forming support beams and, more specifically, to methods of forming composite J-beams.

2) Description of Related Art

One part that is widely used by aircraft and other structures is a support beam. One type of support beam is a J-beam, which is used for cargo floor beams, wing spars, and various other structures. Composite materials are often selected to form support beams, such as J-beams, since composite materials may be a lighter alternative to metals while still maintaining sufficient strength. Composite J-beams may be formed from an assemblage of "C" and "Z" channels. Typically, composite "C" channels are formed, among other ways, with an elastomeric membrane hot forming machine. Composite "Z" channels are usually fabricated by hand lay up of a resin-impregnated fibrous material on a "Z" channel tool.

The drive for increased speed and efficiency and a desire to reduce fabrication costs have led manufacturers of J-beams to seek manufacturing methods to form beams in a short amount of time and at a low cost. Prior and emerging art have provided limited capabilities to satisfy these requirements. When using composite material, one difficult challenge in forming a J-beam is the forming operation of the "Z" channel. The fabrication of the "Z" channel is largely performed by hand. Unfortunately, the current method of fabrication of the "Z" channel is labor intensive. As such, the speed of production is slow, and the efficiency is low. The labor intensive fabrication process drives up production costs.

Thus, there exists a need for a more efficient method of forming a composite support beams, including composite J-beams. It would be advantageous to have a fabrication process based upon more automation and less labor. In addition, it would be advantageous to provide methods to increase the production rate while making the process cost effective.

SUMMARY

Embodiments of the disclosure may address the above needs and achieve other advantages by providing methods for fabricating support beams, such as J-beams. Generally, embodiments of the disclosure provide methods for fabricating support beams with greater efficiency by way of more automation than conventional approaches. In one embodiment, for example, support beams may be formed by bending a charge to create either one or two "Z" channels while the charge is in contact with either one or two "C" channels.

In one embodiment, a method of creating a support beam from a C-shaped charge and an additional charge is provided. The method includes supporting a C-shaped composite charge on a first forming tool and placing an additional composite charge on at least a portion of the C-shaped composite charge. The method further includes placing a second forming tool proximate the first forming tool and positioning a fixed forming tool proximate a first portion of the additional composite charge with the additional composite charge extending thereacross. The method may include heating the first forming tool, the fixed forming tool, or both prior to formation of the support beam. Additionally, the method includes bending a second portion of the additional composite charge about the fixed forming tool into a bent configuration resulting in the formation of a support beam, such as a J-beam. The bending of a second portion of the additional charge may include inflating at least one bladder proximate the first forming tool. The method may include curing the support beam once the second portion of the additional composite charge is bent. The method may include bending a third portion of the additional composite charge about the first forming tool. The method may also include bending the second and third portions of the additional composite charge concurrently.

An additional embodiment provides a method for forming a pair of support beams, such as J-beams. The method includes supporting first and second C-shaped composite charges upon first and second forming tools, respectively. The first and second forming tools may be heated to enhance forming operations. The method further includes placing an additional charge upon at least portions of the first and second charges and a third forming tool positioned between the first and second forming tools. In addition, the method includes positioning a fixed forming tool proximate an intermediate portion of the additional charge that extends between the first and second charges. The method may include making a release cut in the additional charge prior to positioning the fixed forming tool. The method includes moving the first and second forming tools relative to the fixed forming tool in order to bend portions of the additional charge that are proximate the first and second forming tools into a bent configuration relative to the intermediate portion of the additional charge. For example, the inflation of at least one bladder proximate each of the first and second forming tools can move the first and second forming tools relative to the fixed forming tool. In order to enhance formation operations, a vacuum bag may be inflated that encloses the first, second, and fixed forming tools, the first, second, and additional charges, and each bladder. Alternatively, the activation of mechanical actuators that are operably connected to the first and second forming tools, respectively, can move the first and second forming tools relative to the fixed forming tool. The method may include curing the support beams once the first and second forming tools are moved. In addition, the method may include bending a first end portion and second end portion of the additional charge about the first and second forming tools, respectively. The method includes separating the pair of support beams by dividing the intermediate portion of the additional charge.

Another embodiment provides a method for forming a pair of support beams, such as J-beams. The method includes supporting first and second C-shaped composite charges upon first and second forming tools, respectively. The method further includes placing an additional charge upon at least portions of the first and second charges and a third forming tool positioned between the first and second forming tools. In addition, the method includes positioning a fourth forming tool proximate the first forming tool and a fifth forming tool proximate the second forming tool. The third forming tool can be heated to enhance formation operations. The method may also include cutting in two the additional charge before moving the third forming tool. The method includes moving the third forming tool toward the additional charge to bend portions of the additional charge and thereby form the pair of support beams. In addition, the method may include curing the support beams after the third forming tool is moved. The method may include bending a first end portion and a second end portion of the additional charge about the first and second forming tools, respectively.

BRIEF DESCRIPTION ILLUSTRATIONS

Having thus described the embodiments of the disclosure in general terms, reference will now be made to the accompanying illustrations, which are not necessarily drawn to scale, and wherein:

DETAILED DESCRIPTION

The embodiments will now be described more fully hereinafter with reference to the accompanying illustrations, in which some, but not all embodiments of the inventions are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Figure 1:
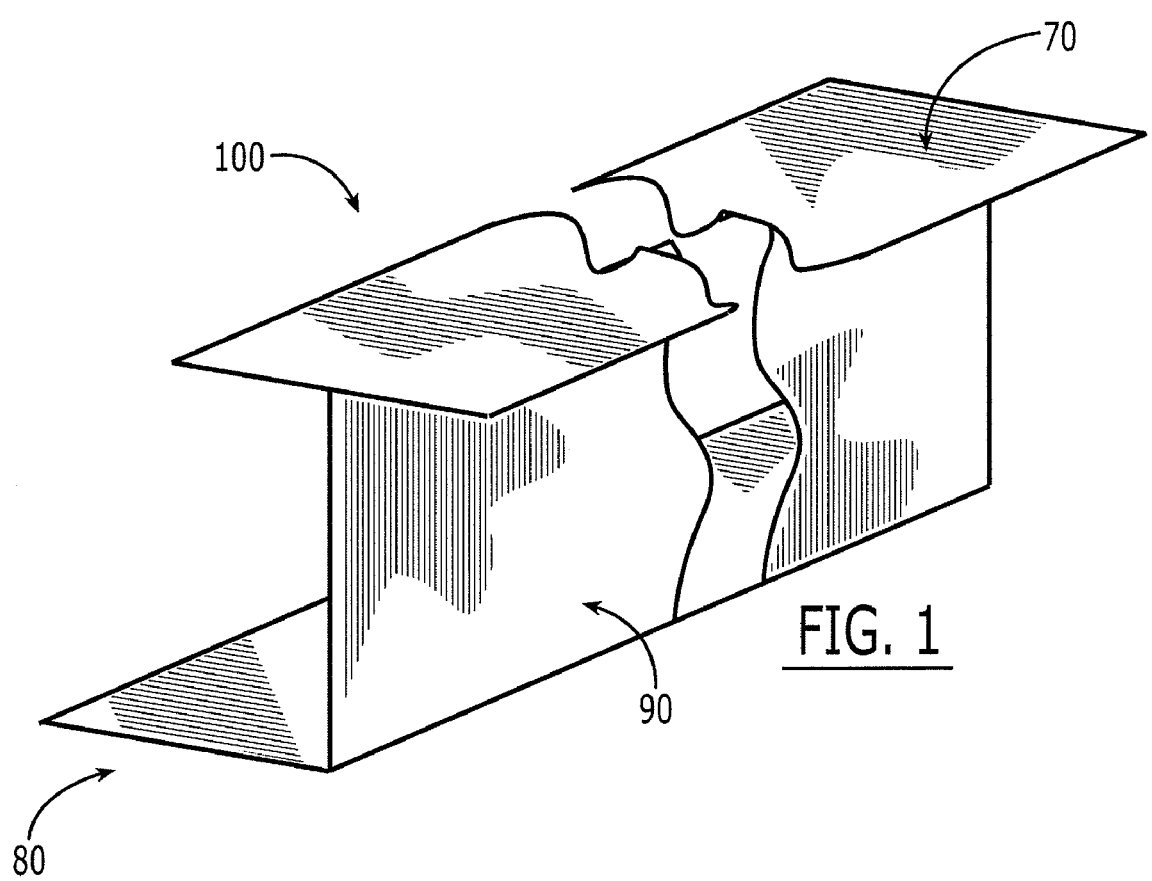
FIG. 1 is a perspective illustration of a J-beam.

Referring now to FIG. 1, there is shown a support beam and, more particularly, a J-beam 100 with a flat cap 70, a flange 80, and a web 90 extending therebetween. J-beams 100 can be formed of composites, metals, and other materials. In conjunction with the fabrication methods described below, J-beams 100 formed of composite materials, such as a ply or sheet of prepreg material, which may include a matrix of graphite fibers preimpregnated with a conventional resin, will be primarily described. J-beams 100 can be used in a variety of applications including, but not limited to, cargo floor beams and wing spars. J-beams 100 can be used as support beams for structures in a variety of industries including, but not limited to, aerospace, aeronautical, automobile, and marine industries.

Figure 2:
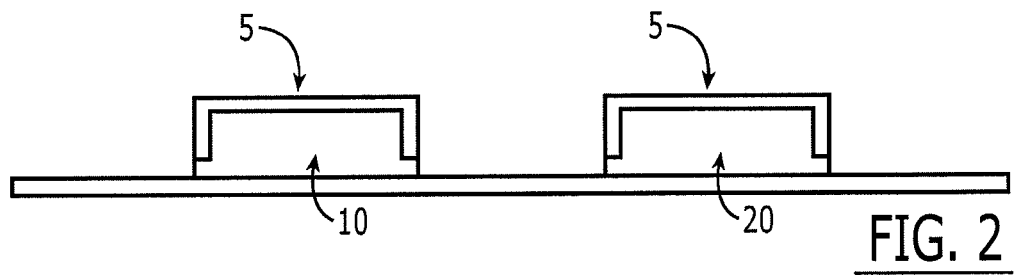
FIG. 2 is a section illustration of part of the forming apparatus with two C-shaped composite charges according to one embodiment.

In order to fabricate a composite J-beam 100 in accordance with one embodiment, the first forming tool 10 and second forming tool 20 shown in FIG. 2 initially support C-shaped charges 5. The first forming tool 10 and second forming tool 20 can be formed of Invar or aluminum but may be fabricated from any suitable material. The first and second forming tools 10,20 are shown as rectangular in FIG. 2 but they may have other shapes. Also, first forming tool 10 and second forming tool 20 are shown to be the same size and shape but they can differ from one another. The C-shaped charges 5 are normally formed of at least one ply or pre-plied sheet of prepreg material such as a matrix of graphite fibers preimpregnated with a conventional resin, but may be formed of other materials including, but not limited to, woven cloth, unidirectional tape, multidirectional material, and glass fibers. The C-shaped charges 5 may be formed on the first forming tool 10 and second forming tool 20. For example, the C-shaped charges 5 may be formed by way of hot forming tools or other devices. The process of forming by hot forming tools includes placing flat composite sheets on respective tools and then using hot forming tools or other conventional forming devices to bend the composite material about the edges of respective tools. The bent portions of the composite sheets are typically equal in length or size but may differ. In some embodiments, alternatively, C-shaped charges 5 may be preformed and then placed on the first and second forming tools 10,20.

Figure 3:
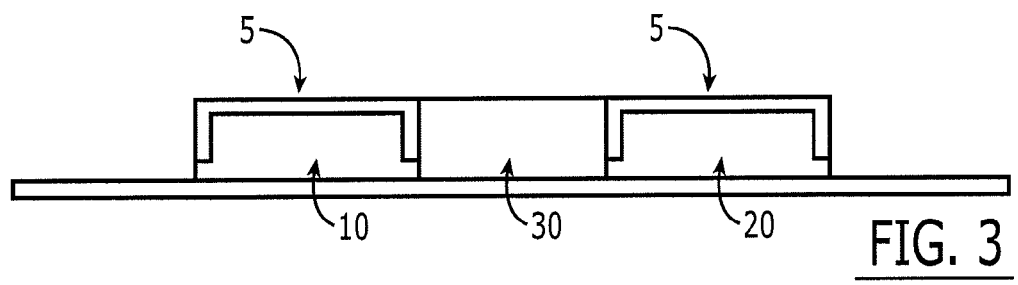
FIG. 3 is a section illustration of part of the forming apparatus with two C-shaped composite charges according to one embodiment.
Figure 4:
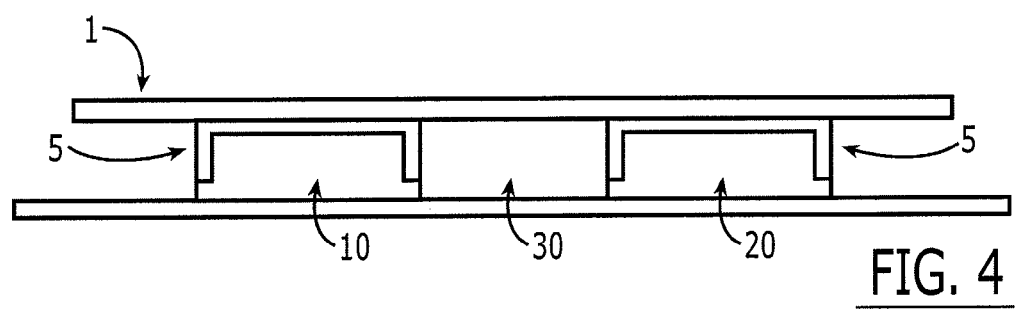
FIG. 4 is a section illustration of part of the forming apparatus with two C-shaped charges and one additional composite charge according to one embodiment.

The first forming tool 10 and second forming tool 20 are spaced from each other to allow for a third forming tool 30 to be placed between them as shown in FIG. 3. Typically, the third forming tool 30 is formed of the same material as the first and second forming tools 10,20, such as Invar or aluminum. Generally, the third forming tool 30 fills the space between first forming tool 10 and second forming tool 20. As shown in FIG. 4, the third forming tool 30 is at the same height as the C-shaped charges 5, therefore providing a flat continuous uniform surface on which to position an additional charge 1. The additional charge 1 is then positioned to be properly indexed atop the C-shaped charges 5 and third forming tool 30 as shown in FIG. 4. Additional charge 1 is normally formed of the same material as that forming the C-shaped charges 5, such as a ply or pre-plied sheet of prepreg material. For example, additional charge 1 may be formed of a matrix of graphite fibers preimpregnated with a conventional resin. Of course, it may be formed of other materials in other embodiments.

Figure 5:
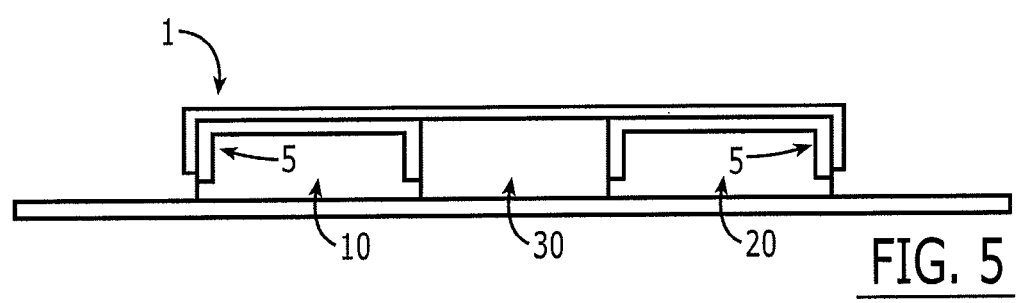
FIG. 5 is a section illustration of part of the forming apparatus with two C-shaped and one additional composite charge according to one embodiment.

As shown in FIG. 5, the ends of the additional charge 1 may be formed about the first forming tool 10 and second forming tool 20. Typically, the ends of the additional charge 1 extend by the same amount beyond an end of each the first forming tool 10 and second forming tool 20, but may differ if desired. Generally, the ends of the additional charge 1 extend beyond the ends of the first and second forming tools 10,20 by the same amount as the bent portions of the C-shaped charges 5. For example, the ends of the additional charge 1 can be formed by way of a hot forming machine or other device known to those skilled in the art while the additional charge 1 sits atop the C-shaped charges 5 and third forming tool 30. Then, a release cut may be made to the additional charge 1, such as by using an ultrasonic knife or other device. A release cut may provide for an easier and more desirable bending process with respect to additional charge 1.

Figure 6:
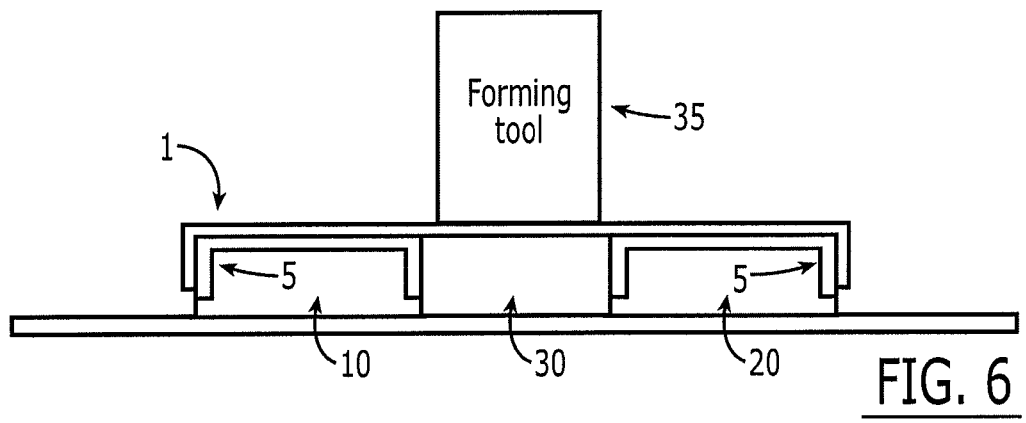
FIG. 6 is a section illustration of the forming apparatus with two C-shaped and one additional composite charge according to one embodiment.

A fixed forming tool 35 may then be positioned above the third forming tool 30 as in FIG. 6. The fixed forming tool 35 can be formed of Invar or aluminum but may be another material. The width of fixed forming tool 35 is typically about the width of third forming tool 30 while the height of fixed forming tool 35 can vary, but is typically at least equal or greater than the width of the wider of the first forming tool 10 and second forming tool 20. Once positioned above the third forming tool 30, fixed forming tool 35 is held in position in contact with additional charge 1. The additional charge 1 may then be bent about the fixed forming tool 35. The additional charge 1 may be bent in various manners. After the additional charge 1 has been bent, the charges 1,5 may be cured, such as by applying radiant heat.

Figure 7:
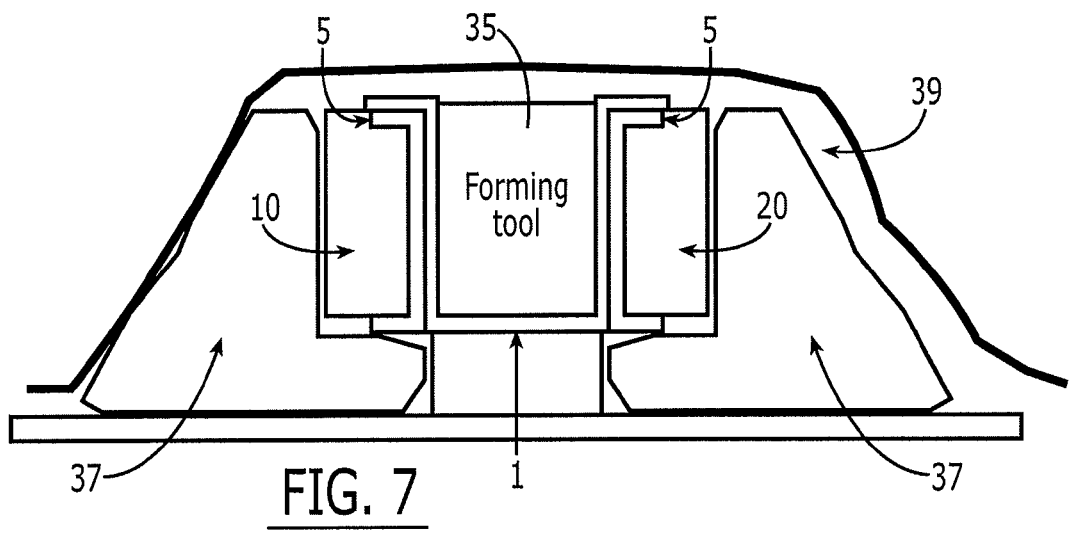
FIG. 7 is a section illustration of the forming apparatus with two C-shaped and one additional composite charge in a bent configuration according to one embodiment.

For example, the additional charge 1 in FIG. 7 is bent by way of bladders 37 folding the first forming tool 10 and second forming tool 20 about opposite sides of the fixed forming tool 35 by inflating bladders 37 underlying first and second forming tools 10,20. As shown in FIG. 7, the bladders 37 may also be surrounded by a vacuum bag 39. Once bladders 37 have been inflated and first forming tool 10 and second forming tool 20 have been folded about fixed forming tool 35, then the pressure in the vacuum bag 39 can be reduced in order to draw the first forming tool 10 and second forming tool 20 closer to fixed forming tool 35. Then, charges 1,5 may be cured, such as by applying radiant heat. Alternatively, the first forming tool 10 and second forming tool 20 may be moved about the fixed forming tool 35 by way of mechanical actuators, not shown, that are operably connected to the first forming tool 10 and second forming tool 20. As with inflation of bladders 37, mechanical actuators can fold first forming tool 10 and second forming tool 20 about opposite sides of fixed forming tool 35. After the first and second forming tools 10,20 are folded, then charges 1,5 may be cured, such as by applying radiant heat. Regardless of the motive force utilized to fold the first and second forming tools 10,20 about the fixed forming tool 35, the first forming tool 10 and second forming tool 20 may be heated prior to movement of first forming tool 10 and second forming tool 20 in order to heat the additional charge 1 so as to facilitate an easier bending process.

Figure 8:
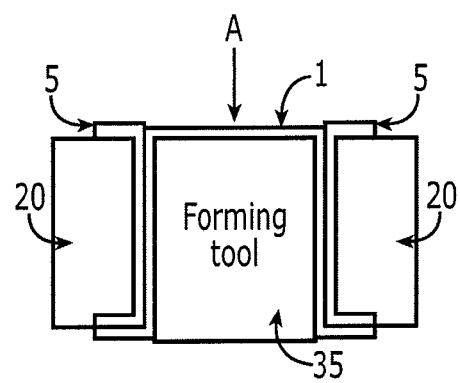
FIG. 8 is a section illustration of part of the forming apparatus with two C-shaped and one additional composite charge in a bent configuration according to one embodiment.

Once formed, the force that was applied to fold the first and second forming tools 10,20 about the fixed forming tool 35 is removed, such as by pressurizing the vacuum bag 39 and deflating the bladders 37 or by retracting the mechanical actuators. The third forming tool 30 is then removed leaving the assembly shown in FIG. 8. In the illustrated embodiment, the additional charge 1 must therefore be separated by dividing it at the position indicated by the arrow A in FIG. 8, such as trimming with a waterjet or other cutting means. After additional charge 1 is divided, first forming tool 10, second forming tool 20, and fixed forming tool 35 are removed leaving two J-beams 100. The sizes of forming tools 10,20,30,35 may be adjusted and the length of charges 1,5 bent around edges may be selected to produce J-beams 100 with different sized features. The above-described embodiment employs both first and second forming tools 10,20 in order to concurrently form two J-beams 100, thereby increasing the overall efficiency of the process. This embodiment of the fabrication process may also be modified to include only a first, third, and fixed forming tools 10,30,35 so as to form a single J-beam 100.

Figure 9:
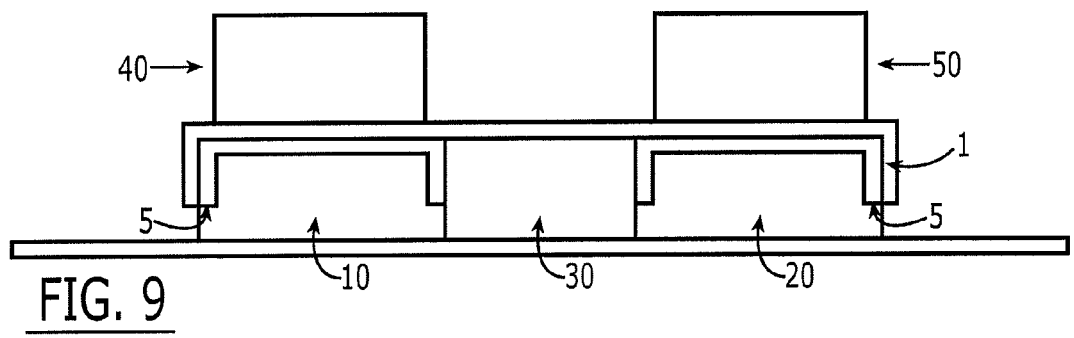
FIG. 9 is a section illustration of the forming apparatus with two C-shaped and one additional composite charge according to another embodiment.

While one embodiment of forming a J-beam 100 has been described, other embodiments of the present invention are also contemplated. For example, once the operations depicted in FIG. 2 through FIG. 5 have been completed, a fourth forming tool 40 and fifth forming tool 50 can be placed above the first forming tool 10 and second forming tool 20, respectively, as shown in FIG. 9. Fourth forming tool 40 and fifth forming tool 50 can be formed of Invar or aluminum but may be another material. The widths of fourth forming tool 40 and fifth forming tool 50 may be the same widths as first forming tool 10 and second forming tool 20, respectively, but can be different so long as the fourth and fifth forming tools 40,50 are spaced by at least the width of the third forming tool 30. The heights of both fourth forming tool 40 and fifth forming tool 50 are generally the same as the height of third forming tool 30 but can be different.

Figure 10:
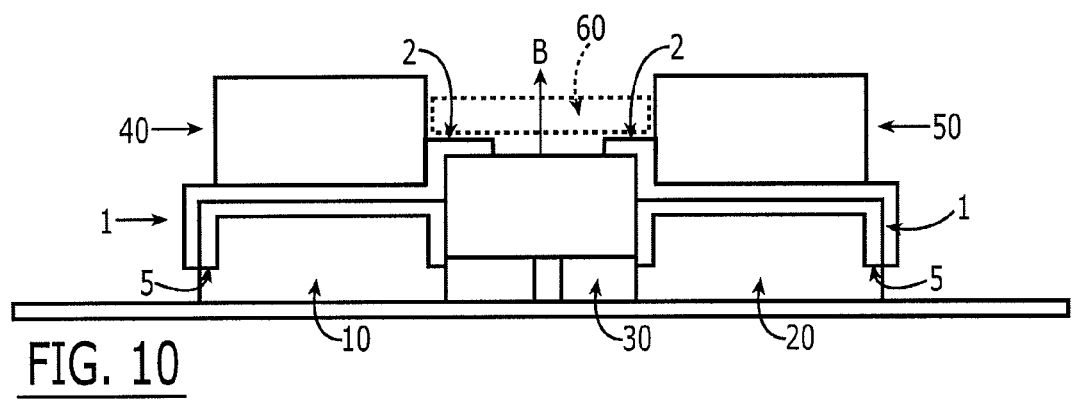
FIG. 10 is a section illustration of the forming apparatus with two C-shaped and one additional composite charge according to another embodiment with the forming partially completed.
Figure 11:
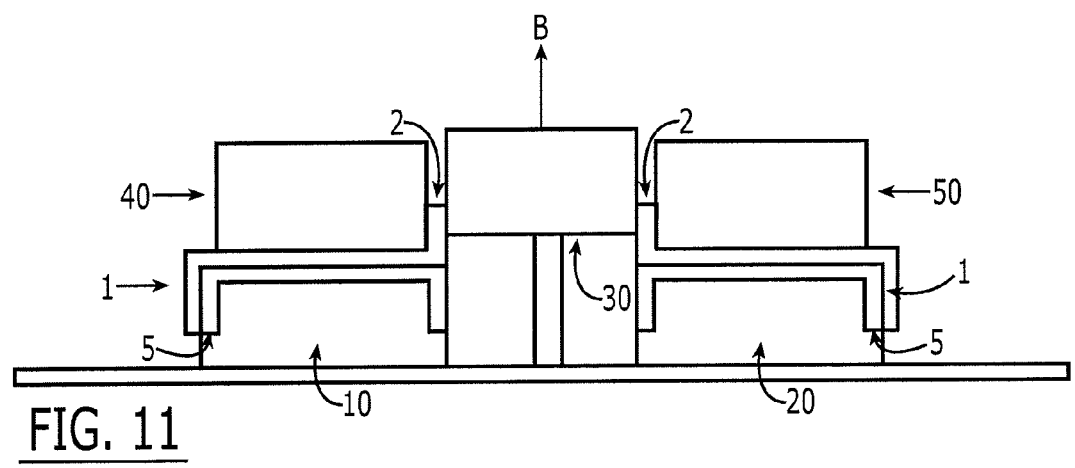
FIG. 11 is a section illustration of the forming apparatus with two C-shaped and one additional composite charge according to another embodiment with the forming completed.

In this embodiment, the additional charge 1 may be separated by dividing it at an intermediate position between fourth and fifth forming tools 40,50, such as at about its midpoint using an ultrasonic knife or other device. The now-divided end portions 2 of the additional charge 1 may then be formed about the fourth and fifth forming tools 40,50 by moving the third forming tool 30 in the direction of the arrow B as shown in FIG. 10. For example, the third forming tool 30 may be mechanically lifted to form the end portions 2 of the divided parts of additional charge 1. The third forming tool 30 may be heated prior to being moved relative to the other forming tools 10,20,40,50 in order to heat the additional charge 1 so as to assist with forming the end portions 2 of the divided parts of additional charge 1. Optionally, a forming aid 60 may be placed on end portions 2, as shown in FIG. 10, or a portion of additional charge 1 proximate third forming tool 30 prior to or during the moving of third forming tool 30. A forming aid 60 can help prevent the additional charge 1 or end portions 2 from lifting away from third forming tool 30. A forming aid 60 can also prevent compression wrinkles in additional charge 1 or end portions 2. A forming aid 60 can be an object with enough weight to hold down the end portions 2 or additional charge 1 or can be a type of resistant force applied by a mechanical device, pneumatic device, or other device. The forming process ends in FIG. 11 with the third forming tool 30 having moved in the direction of the arrow B to the point where the end portions 2 of the divided parts of additional charge 1 are adjacent to and roughly parallel with the sides of the fourth forming tool 40 and fifth forming tool 50. The charges 1,5 may then be cured, such as by applying radiant heat. The forming tools 10,20,30,40,50 may then be removed leaving two J-beams 100. This embodiment of the fabrication process may also be modified to include only a first, third, and fourth forming tools 10,30,40 so as to form a single J-beam 100. By forming a pair of J-beams 100 concurrently as in the illustrated embodiment, the overall efficiency of the fabrication process is increased. Also, as stated before, the sizes of forming tools 10,20,30,40,50 may be adjusted and the length of charges 1,5 bent around edges may be selected to produce J-beams 100 with different sized features.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a pair of support beams comprising:

supporting first composite charges upon first and second forming tools;

positioning the first and second forming tools in a linear arrangement with a third forming tool disposed between the first and second forming tools;

placing an additional composite charge upon at least a portion of the first composite charges and the third forming tool;

positioning a fixed forming tool proximate a first portion of the additional composite charge such that a second portion of the additional composite charge extends beyond the fixed forming tool;

bending the second portion of the additional composite charge into a bent configuration about the fixed forming tool by moving at least one of the first, second and third forming tools relative to another one of the first, second and third forming tools while the fixed forming tool remains proximate the first portion of the additional composite charge; and separating the pair of support beams by dividing the first portion of the additional composite charge.

2. A method of forming a pair of support beams according to claim 1 further comprising curing the support beam once the second portion of the additional composite charge is bent.

3. A method of forming a pair of support beams according to claim 1 further comprising heating the fixed forming tool before the second portion of the additional composite charge is bent.

4. A method of forming a pair of support beams according to claim 1 further comprising heating the first forming tool before the second portion of the additional composite charge is bent.

5. A method of forming a pair of support beams according to claim 1 wherein bending the second portion of the additional charge comprises inflating at least one bladder proximate the first forming tool.

6. A method of forming a pair of support beams according to claim 1 further comprising bending a third portion of the additional composite charge about the fixed forming tool.

7. A method of forming a pair of support beams according to claim 6 wherein bending the second and third portions of the additional composite charge occurs concurrently.

8. A method of forming a pair of support beams comprising:

supporting first and second C-shaped composite charges upon first and second forming tools, respectively;

placing a third forming tool between the first and second forming tools such that the first, second and third forming tools are disposed in a linear arrangement;

placing an additional charge upon at least portions of the first and second charges such that an intermediate portion of the additional charge that extends beyond each of the first and second charges and bridges between the first and second charges is supported by the third forming tool;

positioning a fixed forming tool proximate the intermediate portion of the additional charge that extends between the first and second forming charges;

moving the first and second forming tools relative to the fixed forming tool while the fixed forming tool remains proximate the intermediate portion of the additional charge in order to bend portions of the additional charge that are proximate the first and second forming tools into a bent configuration relative to the intermediate portion of the additional charge; and separating the pair of support beams by dividing the intermediate portion of the additional charge.

9. A method of forming a pair of support beams according to claim 8 further comprising curing the support beams once the first and second forming tools are moved.

10. A method of forming a pair of support beams according to claim 8 further comprising making a release cut in the additional charge prior to positioning the fixed forming tool.

11. A method of forming a pair of support beams according to claim 8 further comprising bending a first end portion and a second end portion of the additional charge about the first and second forming tools, respectively.

12. A method of forming a pair of support beams according to claim 8 wherein moving the first and second forming tools relative to the fixed forming tool comprises inflating at least one bladder proximate each of the first and second forming tools.

13. A method of forming a pair of support beams according to claim 12 further comprising bagging inclusively the first, second, and fixed forming tools, the first, second, and additional charges, and each bladder in a vacuum bag.

14. A method of forming a pair of support beams according to claim 8 wherein moving the first and second forming tools relative to the fixed forming tool comprises activating mechanical actuators that are operably connected to the first and second forming tools, respectively.

15. A method of forming a pair of support beams according to claim 8 further comprising heating the first and second forming tools before portions of the additional charge that are proximate the first and second forming tools are bent.

16. A method of forming a pair of support beams comprising:

supporting first and second C-shaped composite charges upon first and second forming tools, respectively;

placing a third forming tool between the first and second forming tools such that the first, second and third forming tools are disposed in a linear arrangement;

placing an additional charge upon at least portions of the first and second charges such that an intermediate portion of the additional charge that extends beyond each of the first and second charges and bridges between the first and second charges is supported by the third forming tool;

positioning a fourth forming tool proximate the first forming tool and a fifth forming tool proximate the second forming tool; and moving the third forming tool relative to the first and fourth forming tools and relative to the second and fifth forming tools to a position at least partially between the fourth and fifth forming tools to bend portions of the additional charge and thereby form the pair of support beams.

17. A method of forming a pair of support beams according to claim 16 further comprising curing the support beams after the third forming tool is moved.

18. A method of forming a pair of support beams according to claim 16 further comprising bending a first end portion and a second end portion of the additional charge about the first and second forming tools, respectively.

19. A method of forming a pair of support beams according to claim 16 further comprising cutting the additional charge in two before moving the third forming tool.

20. A method of forming a pair of support beams according to claim 16 further comprising heating the third forming tool before forming the pair of support beams.

* * * * *